United States Patent
Hanser et al.

(10) Patent No.: US 8,075,008 B1
(45) Date of Patent: Dec. 13, 2011

(54) RETRACTABLE STAIRCASE FOR A RECREATIONAL VEHICLE

(75) Inventors: Paul E. Hanser, Tipton, IA (US); Vincent D. Buls, Tipton, IA (US)

(73) Assignee: HWH Corporation, Moscow, IA (US)

( * ) Notice: Subject to any disclaimer, the term of this patent is extended or adjusted under 35 U.S.C. 154(b) by 0 days.

(21) Appl. No.: 12/912,922

(22) Filed: Oct. 27, 2010

(51) Int. Cl.
*B60R 3/02* (2006.01)
(52) U.S. Cl. ............ 280/163; 280/166; 182/88
(58) Field of Classification Search ......... 280/163, 280/164.1, 166; 182/88
See application file for complete search history.

(56) References Cited

U.S. PATENT DOCUMENTS

| | | | | | |
|---|---|---|---|---|---|
| 457,040 | A | * | 8/1891 | Baugh | 172/59 |
| 3,291,504 | A | * | 12/1966 | Irizarry | 280/166 |
| 3,408,959 | A | * | 11/1968 | Cripe et al. | 105/447 |
| 3,771,815 | A | * | 11/1973 | Bridges | 280/166 |
| 3,876,230 | A | * | 4/1975 | Phillips | 280/166 |
| 4,180,143 | A | * | 12/1979 | Clugston | 182/91 |
| 4,185,849 | A | * | 1/1980 | Jaeger | 280/166 |
| 4,299,528 | A | * | 11/1981 | Kazeil et al. | 414/546 |
| 4,424,751 | A | * | 1/1984 | Blochlinger | 105/447 |
| 5,228,707 | A | * | 7/1993 | Yoder | 280/166 |
| 5,505,476 | A | * | 4/1996 | Maccabee | 280/166 |
| 5,547,040 | A | * | 8/1996 | Hanser et al. | 182/88 |
| 5,584,493 | A | * | 12/1996 | Demski et al. | 280/166 |
| 5,957,237 | A | * | 9/1999 | Tigner | 182/127 |
| 6,062,805 | A | * | 5/2000 | Tremblay et al. | 414/540 |
| 6,082,751 | A | * | 7/2000 | Hanes et al. | 280/163 |
| 6,213,486 | B1 | * | 4/2001 | Kunz et al. | 280/166 |
| 6,425,627 | B1 | * | 7/2002 | Gee | 296/184.1 |
| 6,655,706 | B1 | * | 12/2003 | Murrell | 280/166 |
| 6,659,224 | B2 | * | 12/2003 | Medsker | 182/91 |
| 6,880,843 | B1 | * | 4/2005 | Greer, Jr. | 280/166 |
| 7,857,337 | B2 | * | 12/2010 | Ferguson et al. | 280/166 |
| 7,878,519 | B2 | * | 2/2011 | Hallmark | 280/166 |
| 7,934,736 | B2 | * | 5/2011 | Kircher | 280/166 |
| 2002/0003340 | A1 | * | 1/2002 | Hallquist | 280/163 |
| 2005/0285365 | A1 | * | 12/2005 | Manser et al. | 280/163 |
| 2006/0181049 | A1 | * | 8/2006 | Kobayashi et al. | 280/166 |
| 2006/0267308 | A1 | * | 11/2006 | Decker et al. | 280/166 |
| 2007/0205573 | A1 | * | 9/2007 | Hallmark | 280/163 |
| 2007/0278760 | A1 | * | 12/2007 | VanBelle et al. | 280/166 |
| 2007/0290475 | A1 | * | 12/2007 | Reitinger | 280/164.1 |

* cited by examiner

*Primary Examiner* — J. Allen Shriver, II
*Assistant Examiner* — James Triggs
(74) *Attorney, Agent, or Firm* — Jason R. Sytsma; Shuttleworth & Ingersoll, PLC

(57) ABSTRACT

According to the present invention, there is provided a retractable staircase for a recreational vehicle. The retractable staircase has a translational section, which includes at least one-step. The translational section moves between an extended and a retracted position relative to the recreational vehicle. In the extended position, a rotational section, which also includes at least one step, moves between a lowered position with the step below the step of the translational section and an upside down and inverted position above the step of the translational section to provide for movement of the translational section to the retracted position.

25 Claims, 13 Drawing Sheets

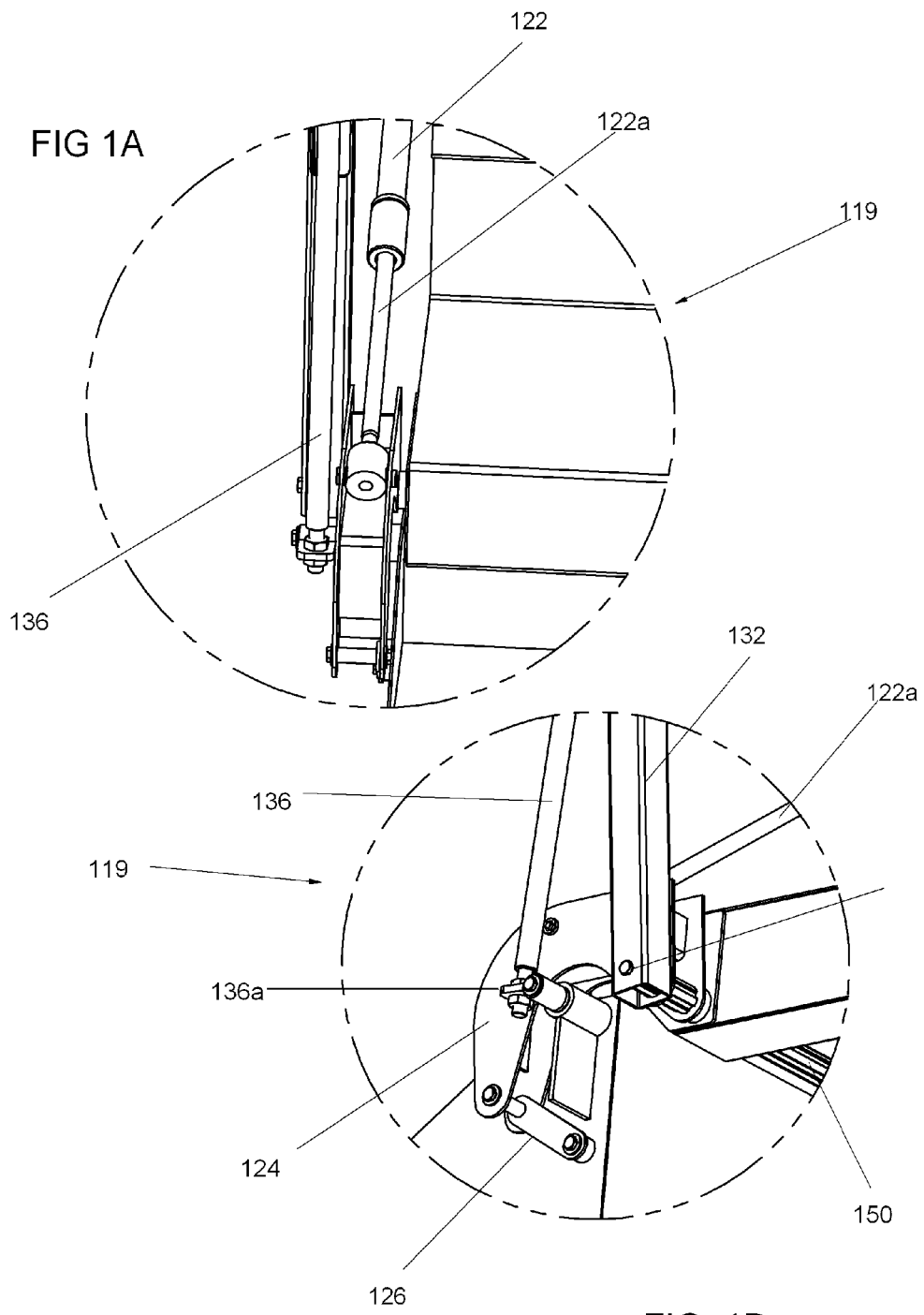

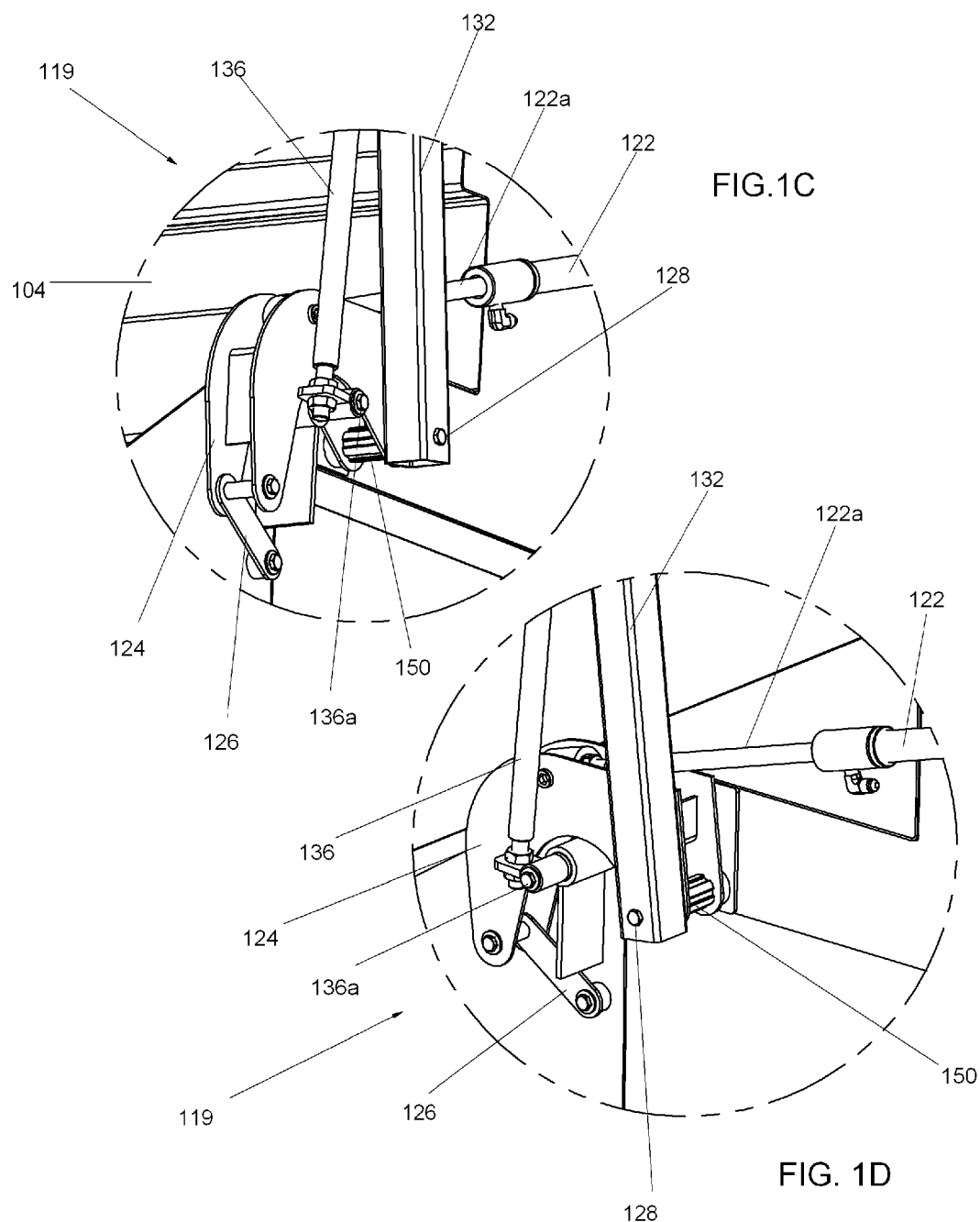

(Section A)

US 8,075,008 B1

RETRACTABLE STAIRCASE FOR A RECREATIONAL VEHICLE

FIELD

This invention relates to a retractable staircase, and more specifically to a retractable staircase for use in a recreational vehicle.

BACKGROUND

The recreational vehicle (RV) industry has long employed ladders and step assemblies to assist entry and exit from the RV. Common RV design requires the use of five stairs to reach the main level due to the height from the ground. Typically, two external steps are used with three more inside the vehicle. When stairs are used inside the vehicle, however, the amount of useable floor space is greatly diminished.

In view of the foregoing, it is desirable to provide a retractable staircase for an RV that does not reduce the amount of useable floor area inside the vehicle.

SUMMARY

According to the present invention, there is provided a retractable staircase for a recreational vehicle. The retractable staircase has a translational section, which includes at least one-step. The translational section moves between an extended and a retracted position relative to the recreational vehicle. In the extended position, a rotational section, which also includes at least one step, moves between a lowered position with the step below the step of the translational section and an upside down and inverted position above the step of the translational section to provide for movement of the translational section to the retracted position.

In another embodiment of the invention, there is provided a handrail combined to the rotational section and adapted to move in synchronization therewith between an extended and a retracted position. The handrail has an upper and a lower arm assembly that pivots relative to each other and lock together in the extended position.

In yet another embodiment, actuators are provided to automate the extension and retraction of the translational section and to automate the movement of the rotational section. In the embodiment having the handrails, the handrails move in automated synchronization with the rotational section.

Other aspects, features, and embodiments of the invention will become apparent upon review of the following description taken in connection with the accompanying drawings. The invention, though, is pointed out with particularity by the appended claims.

BRIEF DESCRIPTION OF THE DRAWINGS

For a more complete understanding of particular embodiments and their features and advantages, reference is now made to the following description, in which:

FIG. 1A is a frontward perspective enlarged view of a lower arm assembly;

FIG. 1B is a side perspective enlarged view of the lower arm assembly;

FIG. 1C is a side perspective enlarged view of the lower arm assembly;

FIG. 1D is a perspective-enlarged view of the lower arm assembly;

DETAILED DESCRIPTION

Figure 20:
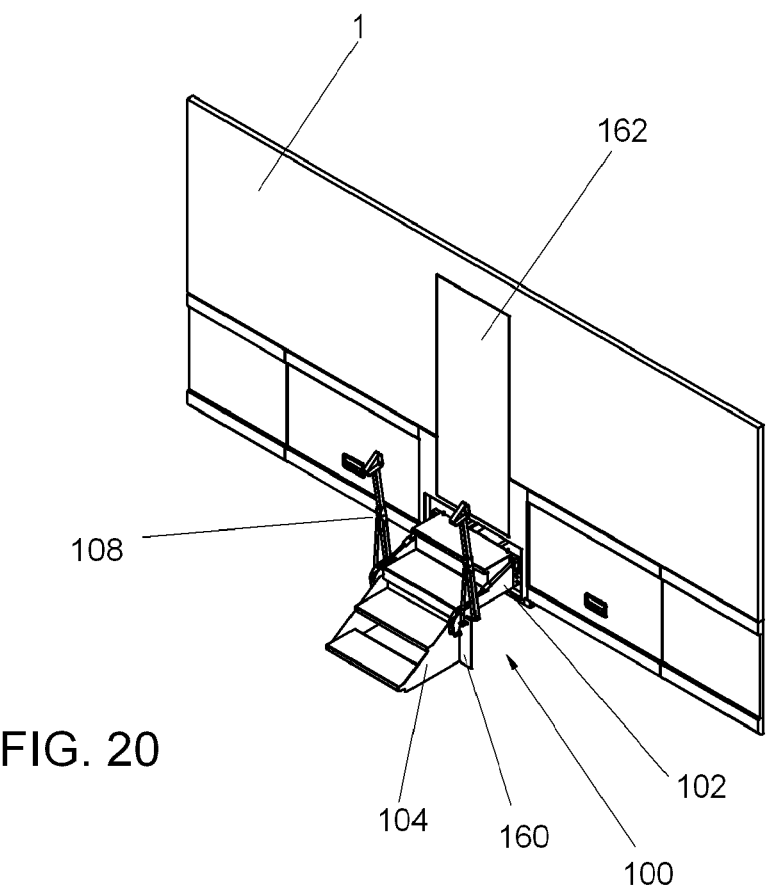
FIG. 20 is a perspective view of a recreational vehicle with the retractable staircase in the extended position as shown in FIG. 1.
Figure 21:
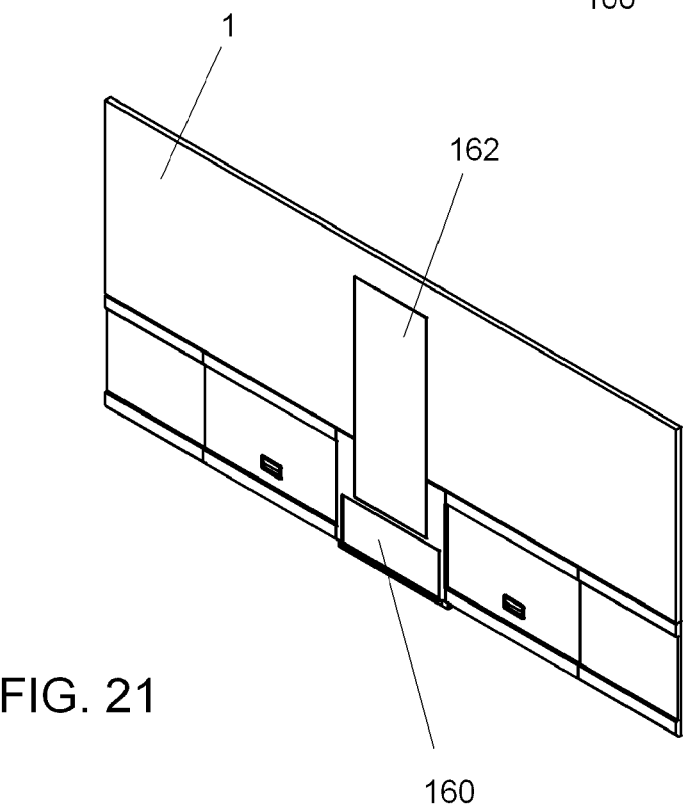
FIG. 21 is a perspective view of the recreational vehicle of FIG. 21 with the retractable staircase in the retracted position as shown in FIG. 13.

Reference will now be made to the drawings wherein like numerals refer to like parts throughout. FIGS. 20-21 illustrate a preferred embodiment of a retractable staircase 100 combined with a recreational vehicle (RV) 1. FIGS. 1-18 provide detailed illustrations of retractable stair case 100 in three positions. The first position represented by FIGS. 1-6 illustrate stair case 100 in a fully extended position with a translational section 102 extended from RV 1 and a rotational section 104 in a lowered position. The second position is an intermediate position and represented by FIGS. 7-12, which illustrate rotational section 104 upside down and inverted above translational section 102 for storage inside RV 1. The third position represented by FIGS. 13-18 illustrates staircase 100 in a fully retracted position inside RV 1.

Stair case 100 includes a base section 106, translational section 102, and rotational section 104. Base section 106 is combined to RV 1 by attaching it to a fixed part of the RV. Translational section 102 is attached to base section 106 and moves between an extended position outside RV 1 and a retracted position inside RV 1. Rotational section 104 is combined to translational section 102 and moves from a lower position engaged near the ground and an upside down and inverted position above translational section 102 for storage inside RV 1. In an exemplary embodiment, staircase 100 also includes a pair of handrails 108 that move to an extended position when rotational section 104 moves to the lowered position.

Base section 106 includes a frame 110 joined to the body of RV 1 to fix retractable staircase 100 to RV 1. In the preferred embodiment, frame 110 is a long structural member, preferably of steel, that extends the width of retractable staircase 100 and is fixed to the frame of RV 1.

Figure 1:
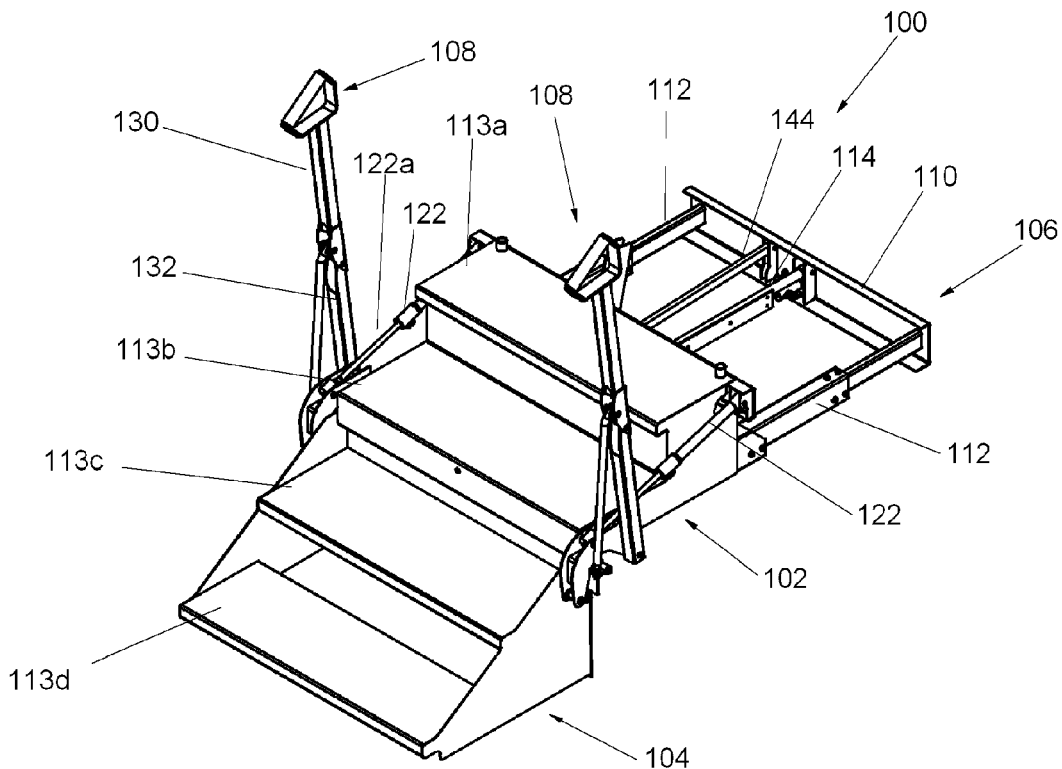
FIG. 1 is a perspective view of a retractable staircase in an extended position.
Figure 2:
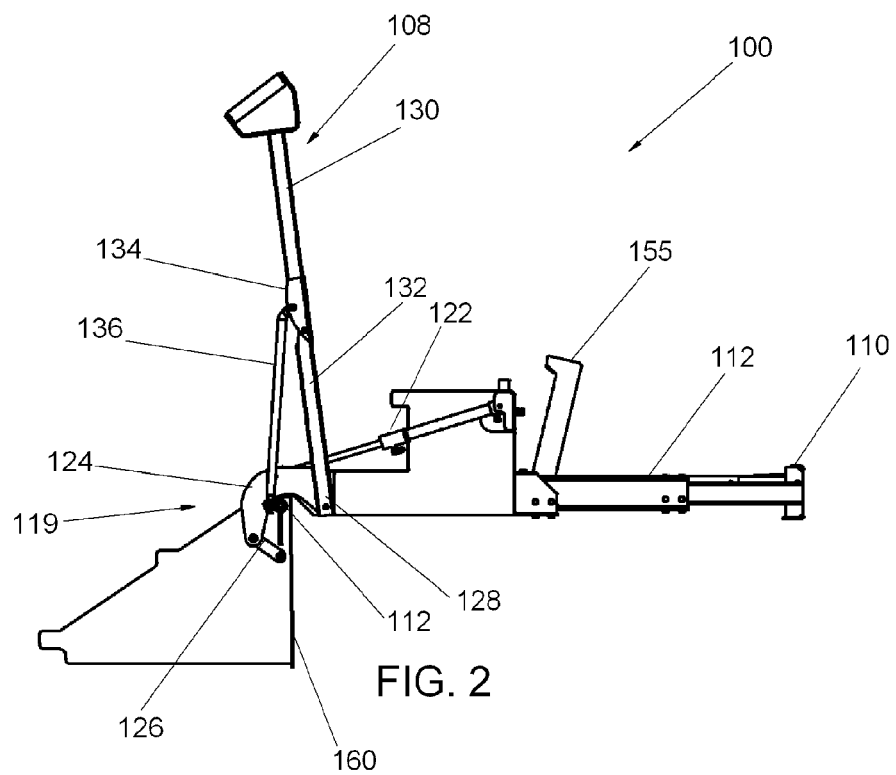
FIG. 2 is a side view of the retractable staircase in the extended position.
Figure 3:
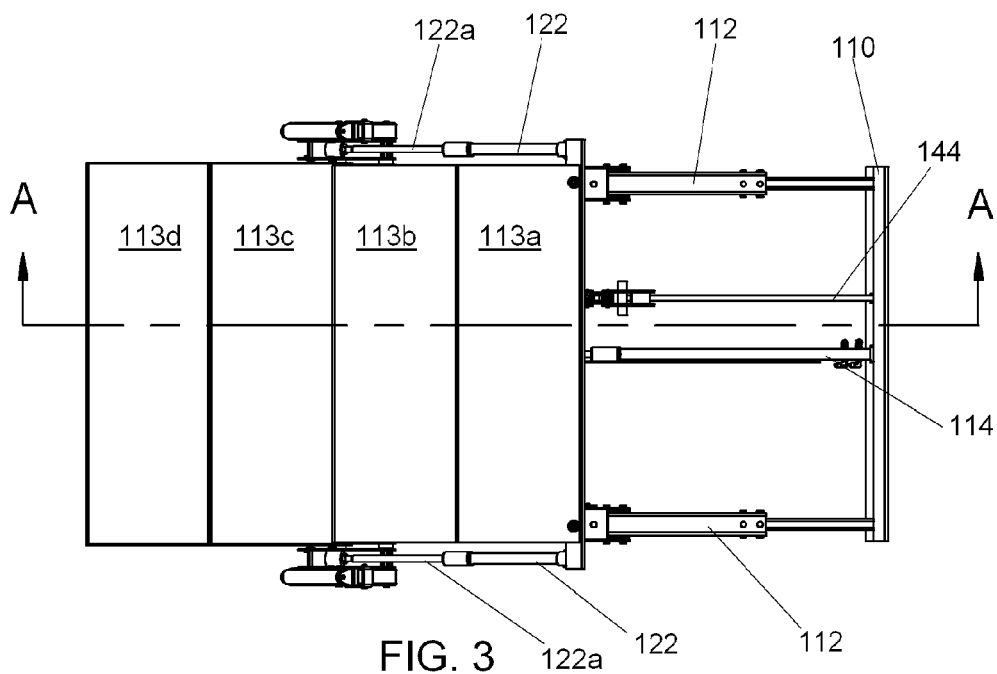
FIG. 3 is a top view the retractable staircase in the extended position.
Figure 4:
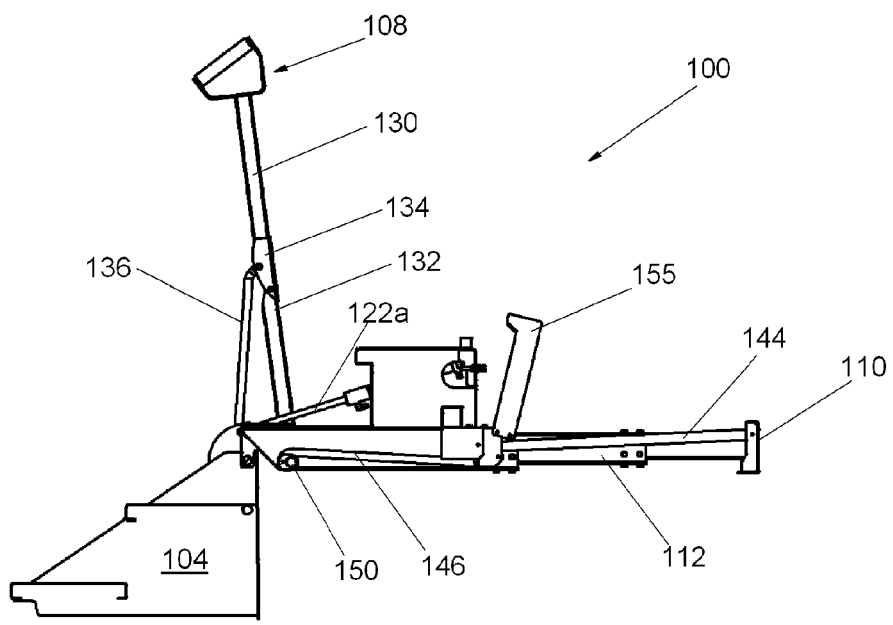
FIG. 4 is a sectional view of the retractable staircase in the extended position as shown in FIG. 3 taken along the line A-A.
Figure 5:
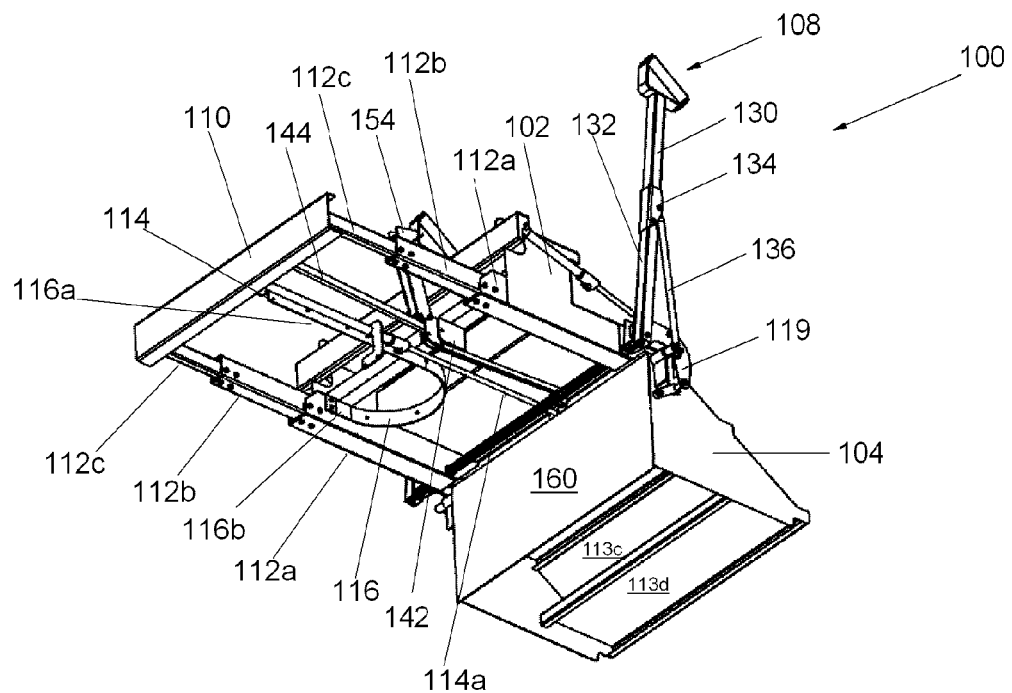
FIG. 5 is a bottom perspective view of the retractable staircase in the extended position.
Figure 6:
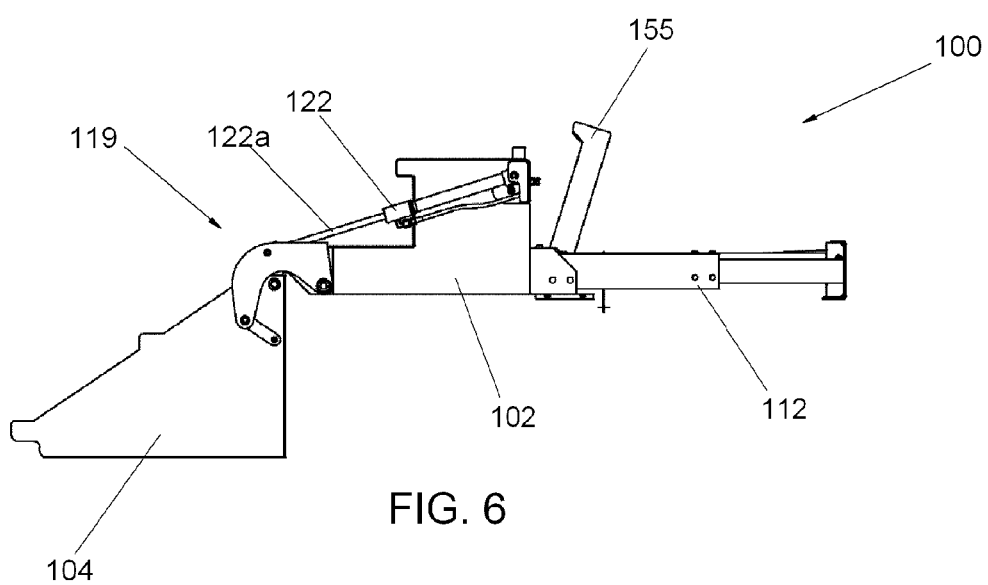
FIG. 6 is a side view of the retractable staircase in the extended position as shown in FIG. 2 with an arm assembly removed.
Figure 7:
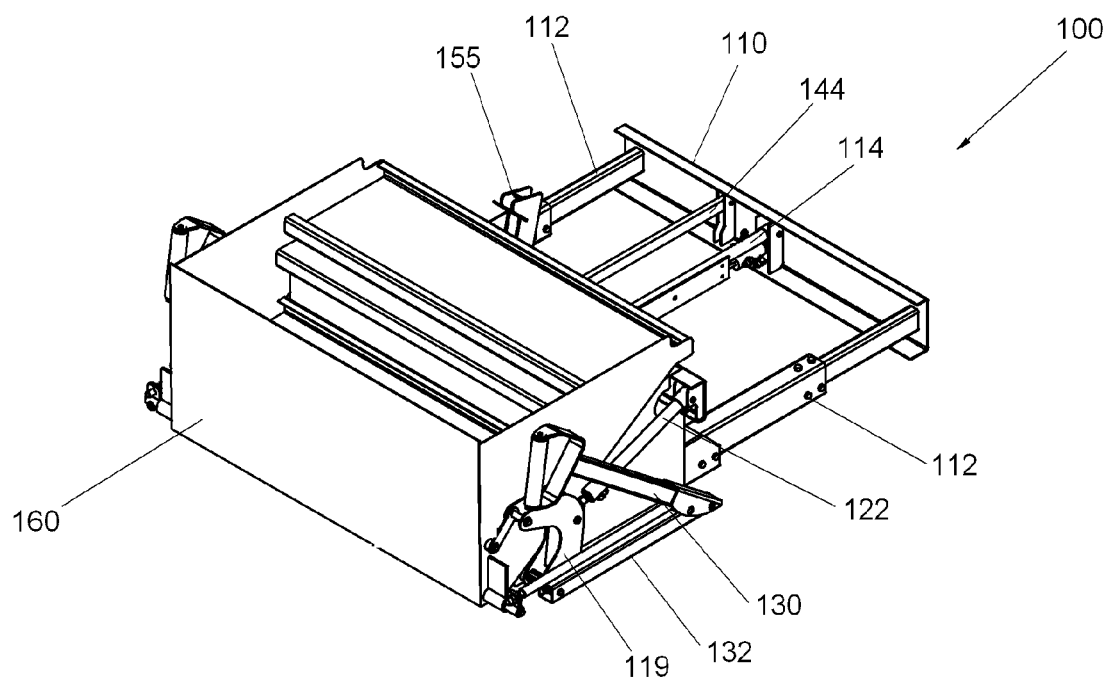
FIG. 7 is a perspective view of the retractable stair case in an intermediate position between the extended and retracted position.
Figure 8:
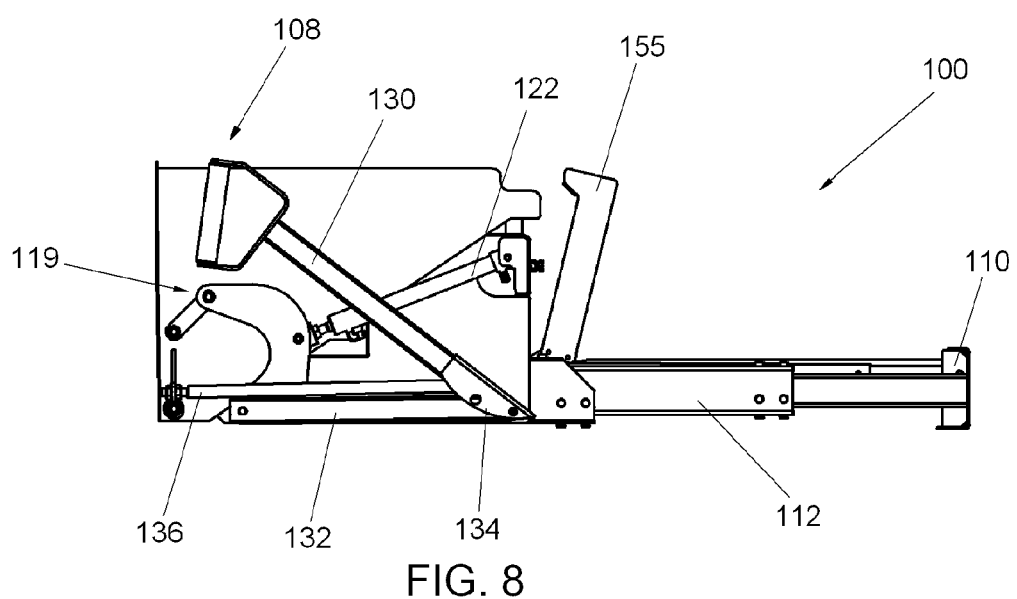
FIG. 8 is a side view of the retractable staircase as shown in FIG. 7.
Figure 9:
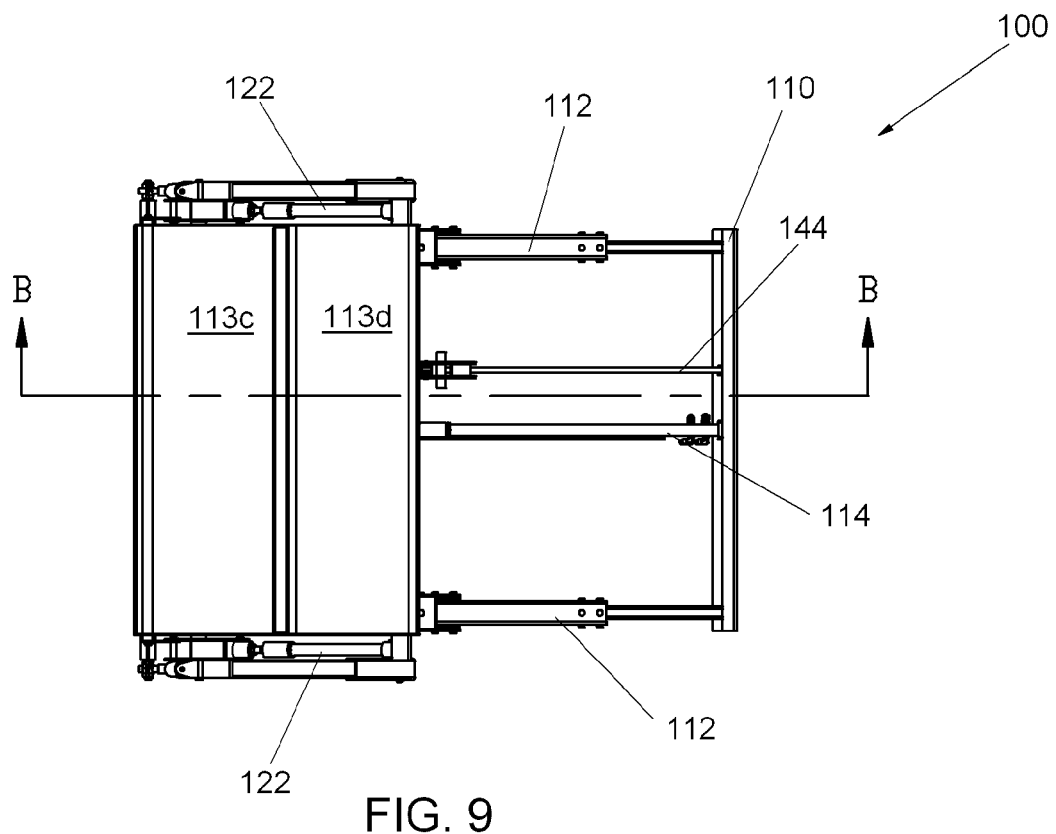
FIG. 9 is a top view of the retractable staircase as shown in FIG. 7.
Figure 10:
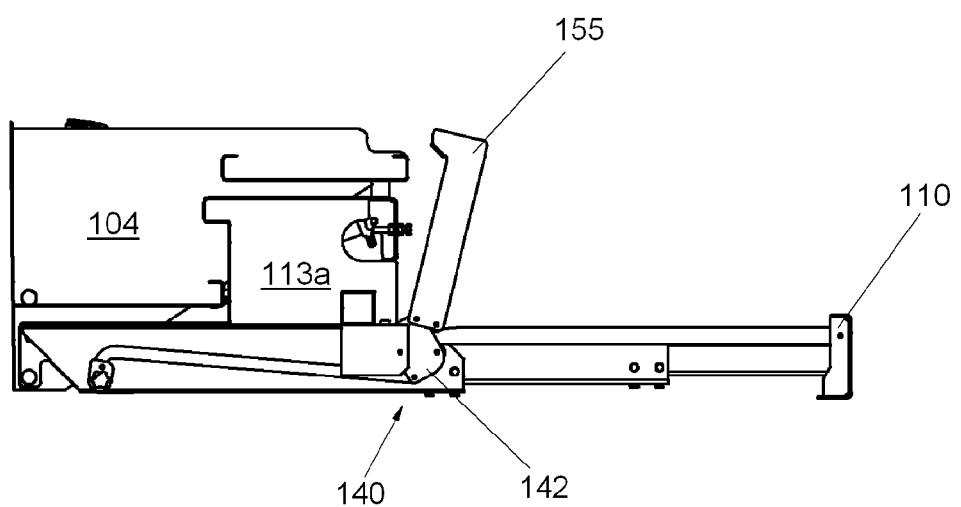
FIG. 10 is a sectional view of the retractable staircase as shown in FIG. 9 taken along the line B-B of FIG. 9.
Figure 11:
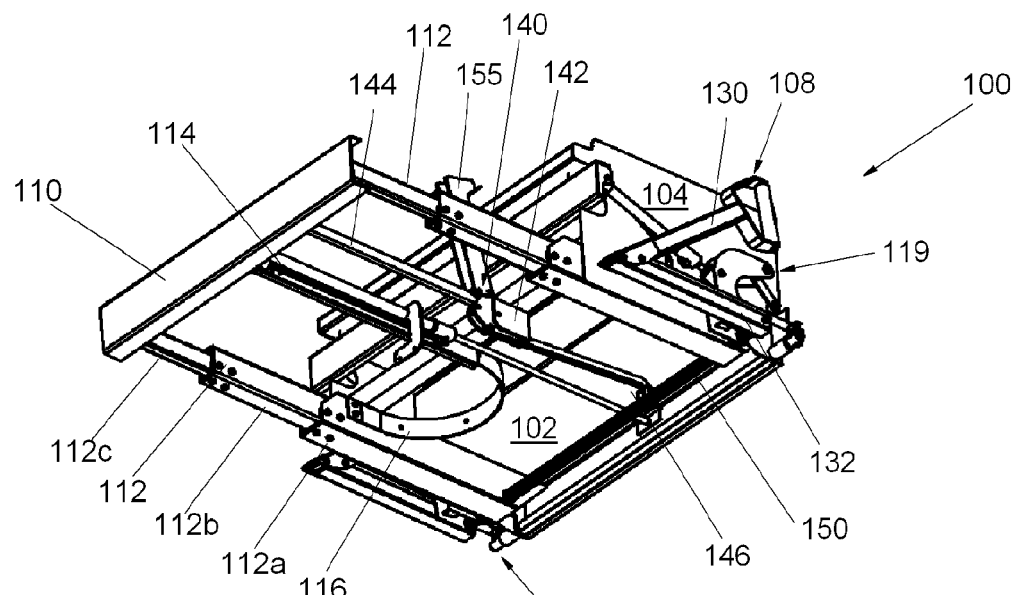
FIG. 11 is a bottom perspective view of the retractable staircase as shown in FIG. 7.
Figure 12:
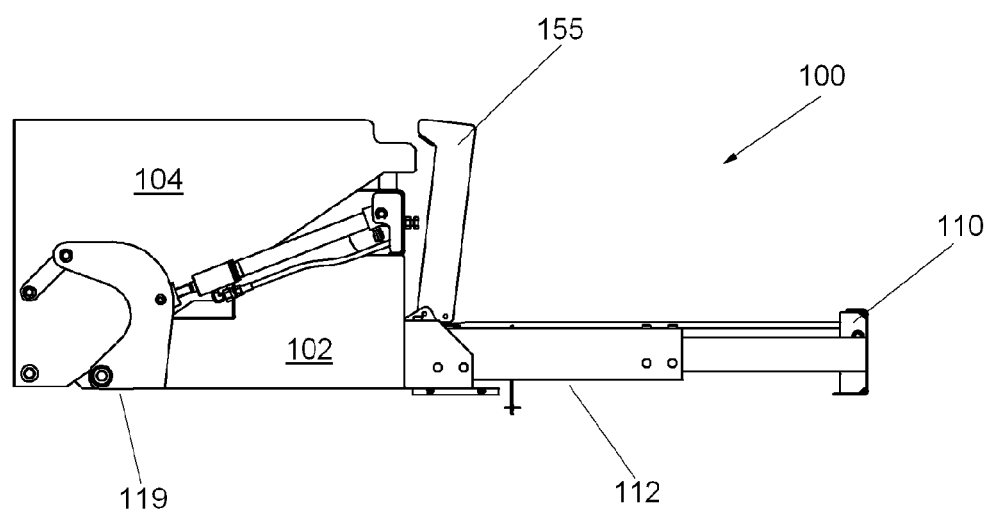
FIG. 12 is a side view the retractable staircase as shown in FIG. 8 with the arm assembly removed.
Figure 13:
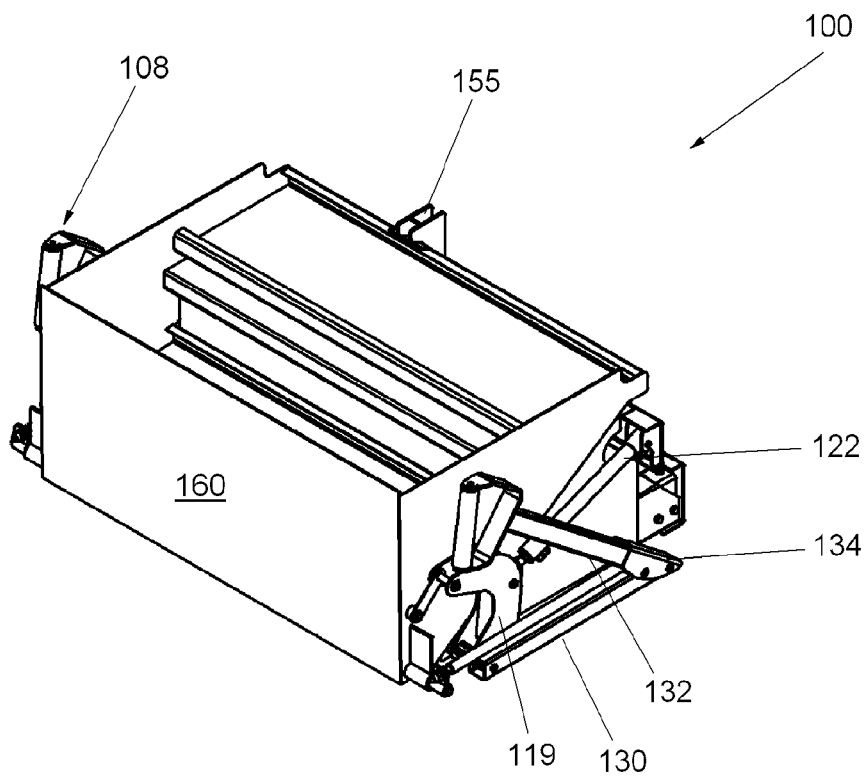
FIG. 13 is a perspective view of the retractable staircase in the retracted position.
Figure 14:
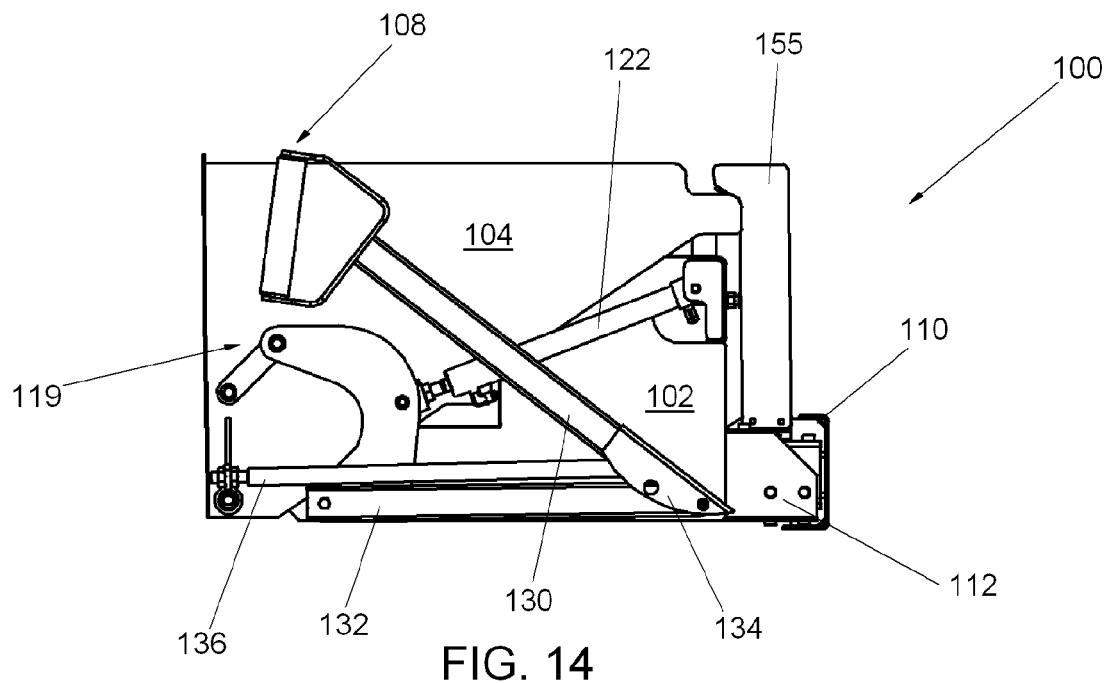
FIG. 14 is a side view of the retractable staircase as shown in FIG. 13.
Figure 15:
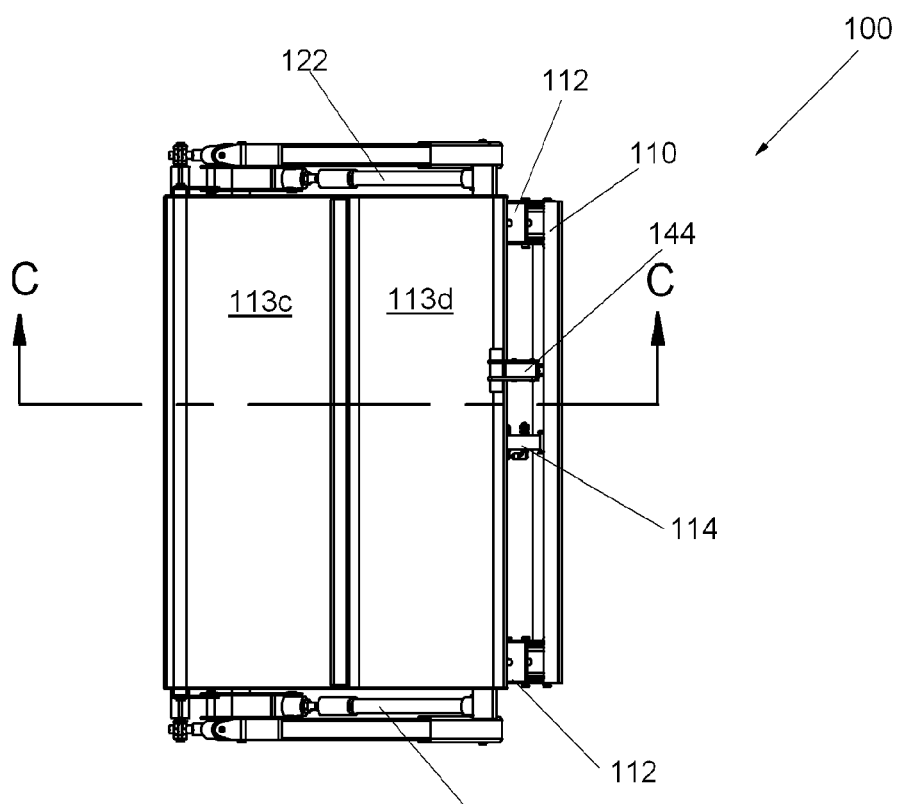
FIG. 15 is a top view of the retractable staircase as shown in FIG. 14.

Referring to FIG. 5, the underside of retractable staircase 100 in the extend position is illustrated. A pair of telescoping tubes 112 moveably joins translational section 102 with frame 110. Each telescoping tube 112 has three tubes 112a, 112b, 112c that extend out from one another. Each outer tube 112a has one of its outer faces fixed to translational section 102 and each inner tube 112c is fixed to frame 110. In this manner, telescoping tubes 112 keep the collapsed depth of retractable staircase 100 small enough to fit in a minimal space, but at the same time allow enough stroke to extend stairs 113a, 113b, 113c, and 113d.

Bearing pads (not shown) provide a reduced friction surface for tubes 112a, 112b, and 112c. Bearing pads are positioned on outer faces of tubes 112b and 112c and on the inner faces of tubes 112a and 112b to allow tubes 112a, 112b, 112c to slide, but not rotate relative to each other.

Positioned between telescoping tubes 112 is a centrally located cylinder 114. Cylinder 114 is attached between translational section 102 and the frame 110 of base 106 to automate the extension and retraction of translational section 102.

Rotational section 104 is pivotally combined to translational section 102 to move from a lower position engaged near the ground and an upside down and inverted position above translational section 102 for storage inside RV 1. Rotational section 104, in the preferred embodiment, has two steps 113c and 113d on its exterior. In the lowered and extended position, rotational section steps 113c and 113d correspond to translational section steps 113a and 113b such that all steps 113a, 113b, 113c, and 113d have a matching rise over run according to safety standards. In the upside down inverted position, rotational section is rotated 180 degrees on its main pivot 120, so that lower stairs 113c and 113d are inverted directly over top upper stairs 113a and 113b and mesh with them. Rotational section 104 fits over and around translational section 102 to provide a compact unit for storage inside RV 1.

Two cylinders 122 on respective sides of staircase 100 move rotational section 104 between its respective positions. Stationary portions of cylinders 122 are attached to translational section 102. Rods 122a of cylinders 122 are connected to rotational section 104 at a lower arm assembly 119. Rotational section 104 pivots about a lower end pivot 136a that combines and synchronizes the movement of rotational section 104 and handrails 108.

As shown in FIGS. 1A-1B, lower arm assembly 119 connects translational section 102 and rotational section 104. Lower arm assembly comprises a curved housing 124 that provides a common point to link rod 122a of cylinder 122 with linkage 126, which linkage 126 is attached to rotational section 104. As curved housing 124 is pushed or pulled by cylinder 122, force is applied through the centerline of linkage 126 to rotational section 104. The centerline of linkage 126 does not extend through the main pivot point 128 (shown in FIG. 5), and therefore cylinder 122 is able to apply a constant force on rotational section 104 throughout its range of movement around main pivot point 128.

In the preferred embodiment, hand rails 108 move between a retracted and extended position in synchronization with the movement of rotational section 104. Handrails 108 include an upper and lower arm 130 and 132 with an overlapping joint 134 positioned therebetween. In the extended position, overlapping joint 134 overlaps lower arm 132 to prohibit upper arm 130 from moving beyond a linear position with respect to the lower arm 132. In the extended position, the handrail 108 is firmly held in a sturdy position.

More specifically, as lower arm 132 rotates towards adjustment arm 136, adjustment arm 136 causes upper arm 130 to rotate upward with respect to lower arm 132. At the extended position, the centerlines of upper and lower arms 130 and 132 are linear and locked together to prohibit continued rotation of upper arm 130. Adjustment arm 136, upper and lower arms 130 and 132, and an imaginary line between main pivot 128 and a lower end pivot 136a of adjustment arm 136 form a triangle, which creates a rigid structure for handrails 108.

Conversely, when lower arm 132 rotates away from adjustment arm 136, the locked upper and lower arms 130 and 132 disengage and pivot relative to one another. Adjustment arm 136 rotates upper arm 130 downward and handrails 108 collapse for storage.

Timing the movement of retractable staircase 100, specifically the rotation of rotational section 104, is an important safety feature. Referring to FIGS. 7-12, rotational section 104 and handrails 108 collapse before translational section 102 retracts into RV 1. Similarly, translational section 102 extends before rotational section 104 and handrails 108 extend.

Figure 19:
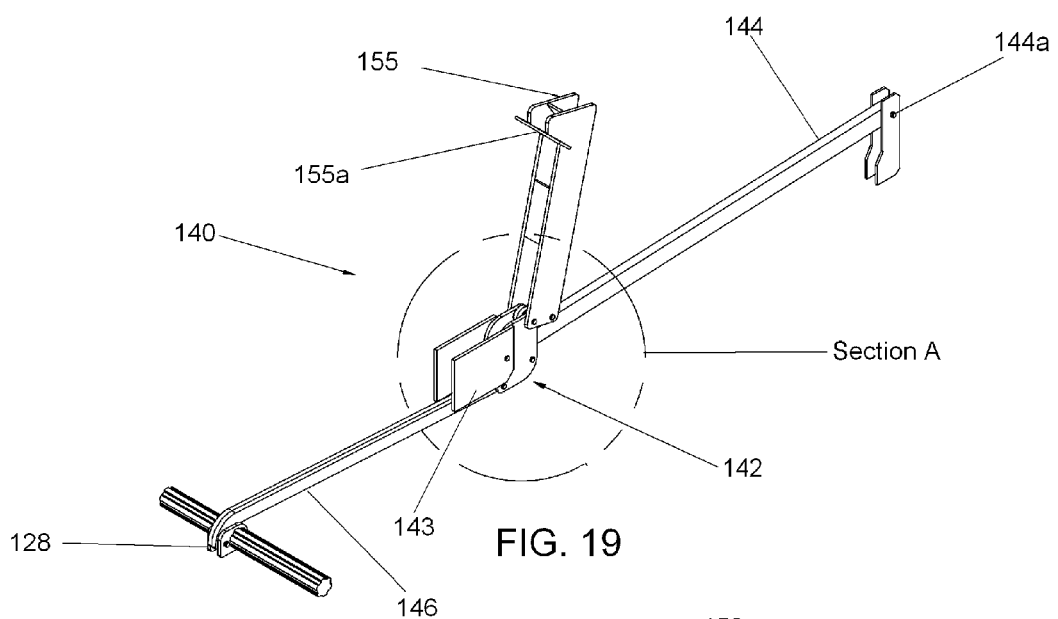
FIG. 19 is a perspective view of a locking assembly.
Figure 19A:
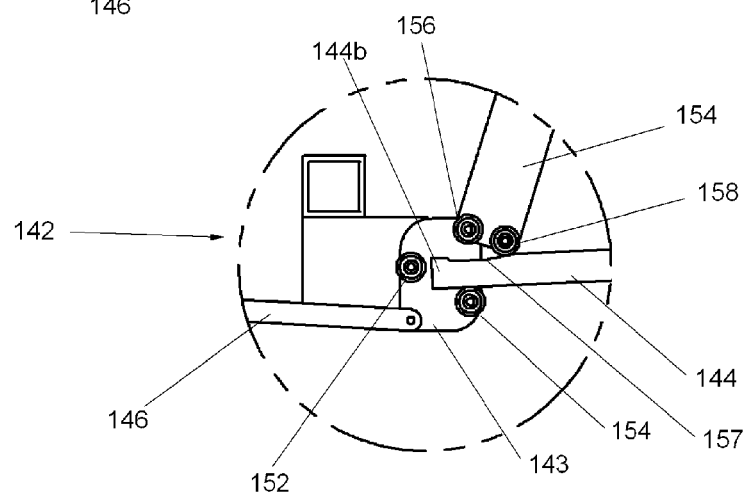
FIG. 19A is a close up view of section A of the locking assembly shown in FIG. 19.

Referring to FIGS. 19 and 19A, a timing mechanism 140 synchronizes the expansion and retraction of rotational section 104 and handrails 108. Timing mechanism 140 is positioned somewhat centrally between telescoping tubes 112 (see FIG. 11) and contains a roller housing assembly 142 that is pivotally connected at a front roller 152 to translational section 102 in the manner described hereinafter. Roller housing assembly 142 includes a roller housing 143, a stop bar 144 with a pivot end 144a pivotally mounted to base 110 and a stopping end 144b extending within the roller housing 143 of roller housing assembly 142. A stop link 146 is pivotally connected to roller housing 143 and extends from roller housing 143 to combine with splined shaft 150 which provides main pivot point 128.

Roller housing 142 includes four rollers. A front roller 152 connected with roller housing 143 serves as a stop for stop bar 144. When aligned with stop bar 144, front roller 152 prohibits movement of stop bar 144 through roller housing 143, and thus prevents translational section 102 from moving to the retracted position. To retract translational section 102, linear force from retraction of rods 122a translates through lower arm assemblies 119 (FIGS. 1A, 1B) to rotate splined shaft 150 clockwise (FIG. 19). Rotational movement of splined shaft 150 translates to linear movement of stop link 146 to cause counter-clockwise rotation of roller housing 143, and rotates a lower roller 154 upward against stop bar 144 until it clears roller 152, to create a path of travel for stop bar 144 through roller housing 143.

Figure 16:
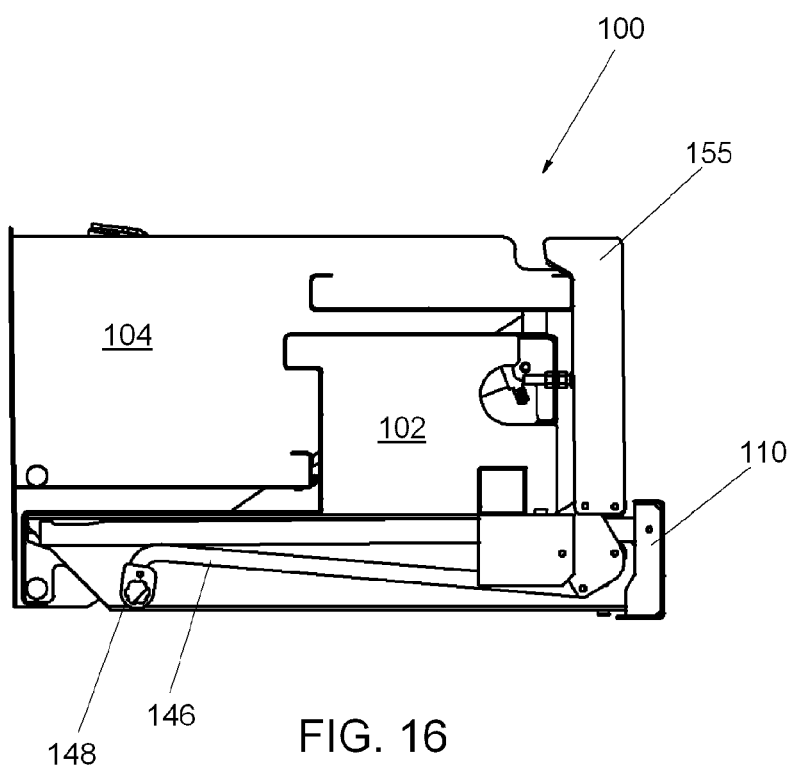
FIG. 16 is a sectional view of the retractable staircase as shown in FIG. 15 taken along the line C-C.
Figure 17:
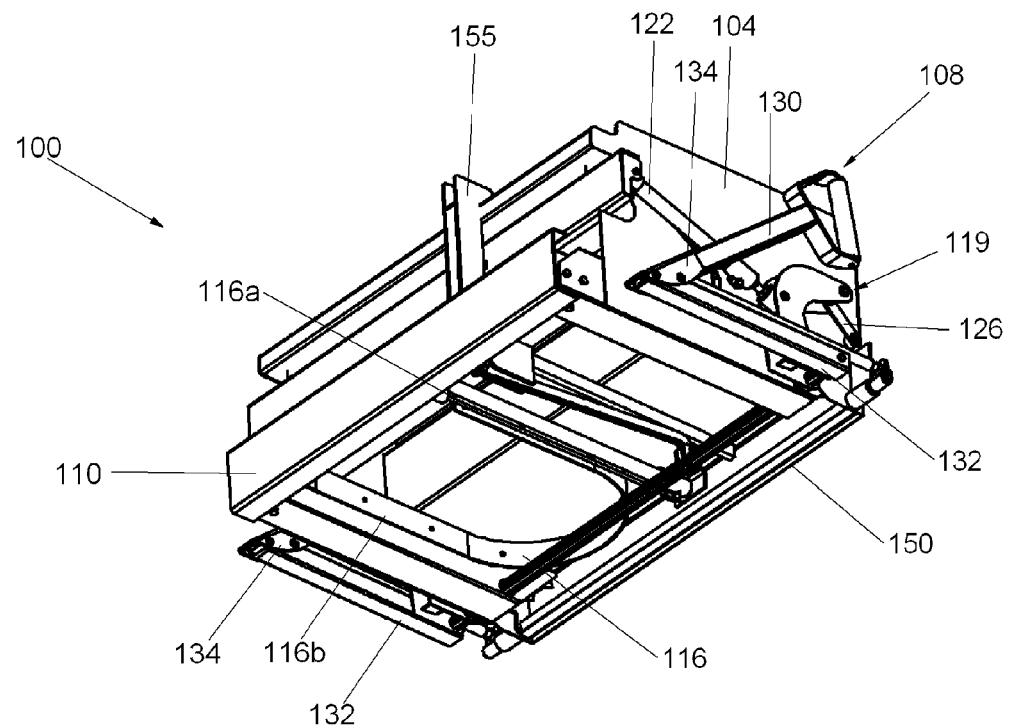
FIG. 17 is a bottom perspective view of the retractable staircase as shown in FIG. 13.
Figure 18:
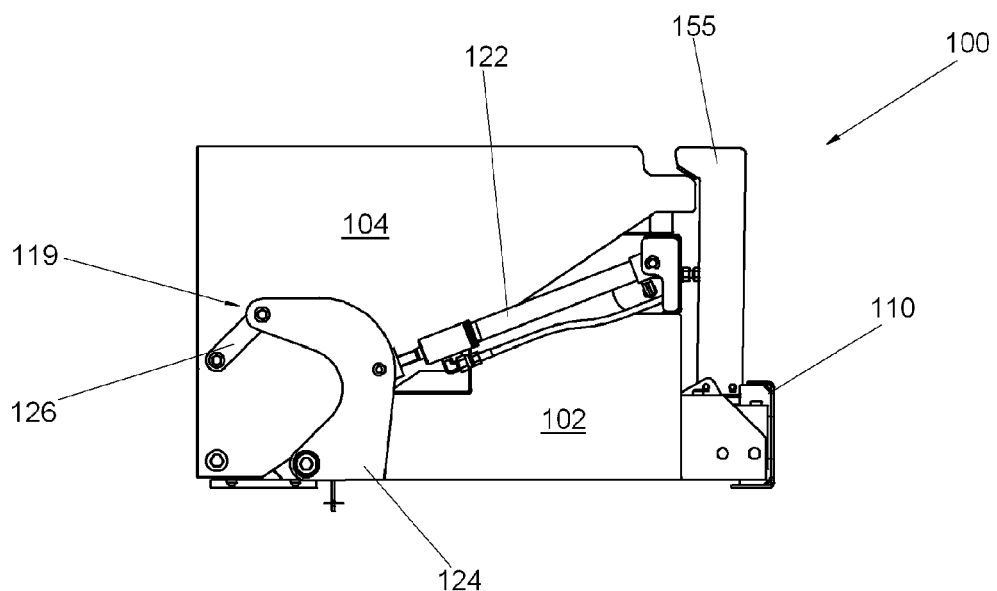
FIG. 18 is a side view of the retractable staircase as shown in FIG. 14 with the arm assembly removed.

A latch arm 155 connected to roller housing 143 holds rotational section 104 in its upside down inverted position above translational section 102 (see FIG. 16). An upper roller 156 connects roller housing 143 to latch arm 155 to allow latch arm 154 to pivot in and out of a latching position with respect to rotational section 104. As stated above, rotational movement of splined shaft 150 translates to linear movement of stop link 146, which causes roller housing 143 to rotate counter-clockwise about 152. As roller housing 143 rotates, lower roller 154 lifts upward against stop bar 144. Upper roller 156 moves counter-clockwise, which rotates latch arm 155 toward its engagement position. Latch arm 155 further includes an outer roller 158 adjacent to upper roller 156 and positioned against stop bar 144.

Latch arm 155 locks rotational section 104 to translational section 102 as follows. Stop bar 144 is raised and roller 158 rotates counter-clockwise about 156. This rotation causes latch arm 155 to rotate towards rotational section 104. Once stop bar 144 clears front roller 152, rotational section 104 is in position for storages and translational section 102 begins to retract. Latch arm 155 begins moving over stop bar 144 and outer roller 158 lifts out of a recessed surface 157 to top surface of stop bar 144. At this point, latch arm 155 is generally vertical with respect to a horizontal line formed between the positions of upper roller 156 and outer roller 158. Latch arm 155 is fully engaged with rotatable section 104 to hold it in place.

In the engaged position, latch arm 155 prevents rotational section 104 from rotating counter-clockwise until translational section 102 is fully extended from RV 1. As translational section 102 moves away from RV 1, upper roller 156 and outer roller 158 roll on top surface of stop bar 144. When translational section 102 is fully extended, outer roller 158 moves down into recessed surface 157 which causes latch arm 155 to pivot away from rotational section 104, thereby unlocking rotational section 104 from translational section 102. Latch arm 155 has an angled engaging surface 155*a* at its top to prevent rotational section 104 from moving when latch arm 155 is locked in place. Angled engaging surface 155*a* prevents latch arm 155 from binding or jamming with rotational section 104 as rotational section 104 rotates to its extended position.

Retractable stairs 100 are adapted for storage inside RV 1 in an area at all times separate from the interior floor space of RV 1. Referring back to FIGS. 20 and 21, retractable staircase 100 fits within a compartment below an entrance 162 to RV 1. A faceplate 160 is mounted to rotational section 104 behind stairs 113*c* and 113*d*. Faceplate 160 is flush with an outer surface of RV 1 when rotational section 104 is in its upside down inverted position above translational section 102. The purpose of faceplate 160 is to conceal and hide retractable staircase 100 when it is not in use. When retractable staircase 100 is in use, faceplate 160 rotates with rotational section 104 to a position behind stairs 113*c* and 113*d*, which protect faceplate 160 from damage.

While the present invention has been particularly shown and described with reference to exemplary embodiments thereof, it should be understood by those of ordinary skill in the art that various changes, substitutions and alterations can be made herein without departing from the scope of the invention as defined by appended claims and their equivalents.

What is claimed is:

1. A retractable staircase for a recreational vehicle, comprising:
    a translational section including at least one step, wherein the translational section is moveable between an extended and a retracted position relative to the recreational vehicle;
    a rotational section including at least one step, moveable between a lower position with the at least one step of the rotational section below the at least one step of the translational section when the translational section is in the extended position and an upside down inverted position above the at least one step of the translational section to provide for movement of the translational section to the retracted position; and
    a hand rail having an upper and a lower arm assembly, the upper arm assembly is synchronized to extend and retract with respect to the rotational section as the rotational section moves between the lower position and the upside down inverted position.

2. A retractable staircase for a recreational vehicle, comprising:
    a translational section including at least one step, wherein the translational section is moveable between an extended and a retracted position relative to the recreational vehicle;
    a rotational section including at least one step, moveable between a lower position with the at least one step of the rotational section below the at least one step of the translational section when the translational section is in the extended position and an upside down inverted position above the at least one step of the translational section to provide for movement of the translational section to the retracted position;
    a hand rail combined to the rotational section and adapted to move in synchronization therewith between an extended and a retracted position; and
    wherein the hand rail further comprises an upper and a lower arm assembly with an overlapping joint positioned therebetween, wherein the upper arm assembly and the overlapping joint overlap the lower arm assembly, such that in the extended position the upper arm assembly is prohibited from moving beyond a linear position with respect to the lower arm assembly to hold the hand rail in a sturdy position.

3. A retractable staircase for a recreational vehicle, comprising:
    a translational section including at least one step, wherein the translational section is moveable between an extended and a retracted position relative to the recreational vehicle; and
    a rotational section including at least one step, moveable between a lower position with the at least one step of the rotational section below the at least one step of the translational section when the translational section is in the extended position and an upside down inverted position above the at least one step of the translational section to provide for movement of the translational section to the retracted position;
    a locking assembly interconnecting the translational section and the rotational section to prevent the translational section from moving between positions when the rotational section is in the lower position and prevent rotational section from moving between positions when the translational section is in the retracted position.

4. The retractable stair case of claim 3, and further comprising: an actuator combined to the rotational section to automate movement thereof and further combined to the locking assembly so that the translational section is prohibited from moving to the retracted position when the rotational section is in the lower position.

5. A retractable staircase for a recreational vehicle, comprising:
    a translational section including at least one step, wherein the translational section is moveable between an extended and a retracted position relative to the recreational vehicle;
    a rotational section including at least one step, moveable between a lower position with the at least one step of the rotational section below the at least one step of the translational section when the translational section is in the extended position and an upside down inverted position above the at least one step of the translational section to provide for movement of the translational section to the retracted position;

a locking assembly to prevent the translational section from moving between positions when the rotational section is in the lower position and prevent rotational section from moving between positions when the translational section is in the retracted position, the locking assembly having a stop link combined to a piston of the actuator at one end and to a housing at the other end; a stop bar combined to the recreational vehicle at one end and to the housing at the other end, and a latch arm combined to the housing at one end and selectively engageable with the rotational section at the other end, wherein when the piston of the actuator moves toward a retracted position the stop link moves toward the recreational vehicle and the housing pivots counter-clockwise to a position where the stop bar is free to move through the housing so that the translational section can move to the retracted position and the latch arm moved to an engaging position with the rotational section to prevent rotation thereof; and an actuator combined to the rotational section to automate movement thereof and further combined to the locking assembly so that the translational section is prohibited from moving to the retracted position when the rotational section is in the lower position.

6. The retractable stair case of claim 5, wherein the housing further comprises: a front roller that selectively engages the stop bar to prevent the stop bar from moving through the housing, thus prohibiting the translational section from moving to the retracted; a lower roller that engages an underside of the stop bar to move the stop bar upward so that the stop bar is free to move through the housing so that the translational section can move to the retracted position; and a upper roller pivotally combined to the latch arm to pivot the latch arm to selective engagement with the rotational section.

7. A recreational vehicle, comprising:
a recreational vehicle;
a translational section combined to the recreational vehicle and including at least one step, wherein the translational section is moveable between an extended position away from the recreational vehicle and a retracted position within the recreational vehicle;
a rotational section including at least one step, moveable between a lower position with the at least one step of the rotational section below the at least one step of the translational section and an upside down inverted position above the at least one step of the translational section; and
a hand rail having an upper and a lower arm assembly, the upper arm assembly is synchronized to extend and retract with respect to the rotational section as the rotational section moves between the lower position and the upsides down inverted position.

8. A recreational vehicle, comprising:
a recreational vehicle;
a translational section combined to the recreational vehicle and including at least one step, wherein the translational section is moveable between an extended position away from the recreational vehicle and a retracted position within the recreational vehicle;
a rotational section including at least one step, moveable between a lower position with the at least one step of the rotational section below the at least one step of the translational section and an upside down inverted position above the at least one step of the translational section; and
a hand rail combined to the rotational section and adapted to move in synchronization therewith between an extended and a retracted position,
wherein the hand rail further comprises an upper and a lower arm assembly with an overlapping joint positioned therebetween, wherein the upper arm assembly and the overlapping joint overlap the lower arm assembly, such that in the extended position the upper arm assembly is prohibited from moving beyond a linear position with respect to the lower arm assembly to hold the hand rail in a sturdy position.

9. The recreational vehicle of claim 8, and further comprising a locking assembly to prevent the translational section from moving between positions when the rotational section is in the lower position and prevent rotational section from moving between positions when the translational section is in the retracted position.

10. The recreational vehicle of claim 9, and further comprising: an actuator combined to the rotational section to automate movement thereof and further combined to the locking assembly so that the translational section is prohibited from moving to the retracted position when the rotational section is in the lower position.

11. A recreational vehicle, comprising:
a recreational vehicle;
a translational section combined to the recreational vehicle and including at least one step, wherein the translational section is moveable between an extended position away from the recreational vehicle and a retracted position within the recreational vehicle;
a rotational section including at least one step, moveable between a lower position with the at least one step of the rotational section below the at least one step of the translational section and an upside down inverted position above the at least one step of the translational section;
a locking assembly to prevent the translational section from moving between positions when the rotational section is in the lower position and prevent rotational section from moving between positions when the translational section is in the retracted position;
an actuator combined to the rotational section to automate movement thereof and further combined to the locking assembly so that the translational section is prohibited from moving to the retracted position when the rotational section is in the lower position; and wherein the locking assembly further comprises: a stop link combined to a piston of the actuator at one end and to a housing at the other end; a stop bar combined to the recreational vehicle at one end and to the housing at the other end, and a latch arm combined to the housing, at one end and selectively engageable with the rotational section at the other end, wherein when the piston of the actuator moves toward a retracted position the stop link moves toward the recreational vehicle and the housing pivots counter-clockwise to a position where the stop bar is free to move through the housing so that the translational section can move to the retracted position and the latch arm moved to an engaging position with the rotational section to prevent rotation thereof.

12. The retractable stair case of claim 11, wherein the housing further comprises: a front roller that selectively engages the stop bar to prevent the stop bar from moving through the housing, thus prohibiting the translational section from moving to the retracted; a lower roller that engages an underside of the stop bar to move the stop bar upward so that the stop bar is free to move through the housing so that the translational section can move to the retracted position; and a upper roller pivotally combined to the latch arm to pivot the latch arm to selective engagement with the rotational section.

13. A retractable staircase for a recreational vehicle, comprising:
- a translational section including at least one step, wherein the translational section is moveable between an extended and a retracted position; and
- a rotational section including at least one step, moveable between a lower position with the at least one step of the rotational section below the at least one step of the translational section and an upside down inverted position above the at least one step of the translational section; and
- a hand rail having an upper and a lower arm assembly, the upper arm assembly is synchronized to extend and retract with respect to the rotational section as the rotational section moves between the lower position and the upsides down inverted position.

14. A retractable staircase for a recreational vehicle, comprising:
- a translational section including at least one step, wherein the translational section is moveable between an extended and a retracted position;
- a rotational section including at least one step, moveable between a lower position with the at least one step of the rotational section below the at least one step of the translational section and an upside down inverted position above the at least one step of the translational section;
- a hand rail combined to the rotational section and adapted to move in synchronization therewith between an extended and a retracted position, wherein the hand rail further comprises an upper and a lower arm assembly with an overlapping joint positioned therebetween, wherein the upper arm assembly and the overlapping joint overlap the lower arm assembly, such that in the extended position the upper arm assembly is prohibited from moving beyond a linear position with respect to the lower arm assembly to hold the hand rail in a sturdy position.

15. The retractable stair case of claim 14, and further comprising a locking assembly to prevent the translational section from moving between positions when the rotational section is in the lower position and prevent rotational section from moving between positions when the translational section is in the retracted position.

16. The retractable stair case of claim 15, and further comprising: an actuator combined to the rotational section to automate movement thereof and further combined to the locking assembly so that the translational section is prohibited from moving to the retracted position when the rotational section is in the lower position.

17. A retractable staircase for a recreational vehicle, comprising:
- a translational section including at least one step, wherein the translational section is moveable between an extended and a retracted position;
- a rotational section including at least one step, moveable between a lower position with the at least one step of the rotational section below the at least one step of the translational section and an upside down inverted position above the at least one step of the translational section;
- a locking assembly to prevent the translational section from moving between positions when the rotational section is in the lower position and prevent rotational section from moving between positions when the translational section is in the retracted position;
- an actuator combined to the rotational section to automate movement thereof and further combined to the locking assembly so that the translational section is prohibited from moving to the retracted position when the rotational section is in the lower position, wherein the locking assembly further comprises: a stop link combined to a piston of the actuator at one end and to a housing at the other end; a stop bar combined to the recreational vehicle at one end and to the housing at the other end, and a latch arm combined to the housing at one end and selectively engageable with the rotational section at the other end, wherein when the piston of the actuator moves toward a retracted position the stop link moves toward the recreational vehicle and the housing pivots counter-clockwise to a position where the stop bar is free to move through the housing so that the translational section can move to the retracted position and the latch arm moved to an engaging position with the rotational section to prevent rotation thereof.

18. The retractable stair case of claim 17, wherein the housing further comprises: a front roller that selectively engages the stop bar to prevent the stop bar from moving through the housing, thus prohibiting the translational section from moving to the retracted; a lower roller that engages an underside of the stop bar to move the stop bar upward so that the stop bar is free to move through the housing so that the translational section can move to the retracted position; and a upper roller pivotally combined to the latch arm to pivot the latch arm to selective engagement with the rotational section.

19. A retractable staircase for a recreational vehicle, comprising:
- a translational section including at least one step, wherein the translational section is moveable between an extended and a retracted position relative to the recreational vehicle;
- a rotational section including at least one step, moveable between a lower position with the at least one step of the rotational section below the at least one step of the translational section when the translational section is in the extended position and an upside down inverted position above the at least one step of the translational section to provide for movement of the translational section to the retracted position; and
- a timing mechanism to prohibit the translational section from moving to the retracted position when the rotational section is in the lower position.

20. The retractable staircase of claim 19, and further comprising a first drive mechanism to drive the translational section between the extended and the retracted position, a second drive mechanism to drive the rotational section between the lower and the upside down and inverted position, wherein the timing mechanism is independent of the second drive mechanism.

21. The retractable staircase of claim 20, wherein the second drive mechanism is combined to the rotational section through a mechanical linkage that has a centerline extending therethrough, the centerline is offset from a pivot point for the rotational section such that the second driver can provide a substantially consistent force on the rotational section as it moves between the lower and the upside down inverted position.

22. The retractable staircase of claim 21, and further comprising a handrail combined to the rotational section and adapted to move in synchronization therewith between an extended position and a retracted position.

23. The retractable staircase of claim 22, wherein the linkage is connected to the rotational section and the lower arm assembly such that the second driver drives the rotational section between the lower, position and the upside down inverted position through the lower arm assembly.

24. The retractable staircase of claim 23, wherein the handrail has an upper and a lower arm assembly, the upper arm assembly is synchronized to extend and retract with respect to the rotational section as the rotational section moves between the lower position and the upside down inverted position.

25. The retractable staircase of claim 24, wherein the hand rail further comprises an overlapping joint positioned between the upper and the lower arm assembly, wherein the upper arm assembly and the overlapping joint overlap the lower arm assembly, such that in the extended position the upper arm assembly is prohibited from moving beyond a linear position with respect to the lower arm assembly to hold the hand rail in a sturdy position.

* * * * *